United States Patent

Brown et al.

[11] Patent Number: 4,644,569
[45] Date of Patent: Feb. 17, 1987

[54] COHERENT DATA WORD TRANSFER BY AN ASYNCHRONOUS GATEWAY DATA PORT

[75] Inventors: Jeffery H. Brown, San Diego; Roger Phillips, Cardiff by the Sea, both of Calif.

[73] Assignee: Teleplex Corporation, San Diego, Calif.

[21] Appl. No.: 637,872

[22] Filed: Aug. 6, 1984

[51] Int. Cl.$^4$ ............................. G06F 5/00; H04L 7/00
[52] U.S. Cl. .................................... 375/118; 364/900; 369/60
[58] Field of Search ........................ 375/118, 119, 121; 370/41, 49, 108; 360/7; 365/78, 194; 369/59, 60; 377/64, 77; 364/900; 328/55

[56] References Cited
U.S. PATENT DOCUMENTS

| | | | |
|---|---|---|---|
| 4,525,849 | 6/1985 | Wolf ..................................... | 375/118 |
| 4,586,159 | 4/1986 | Thomas et al. ..................... | 375/118 |
| 4,596,026 | 6/1986 | Cease et al. ........................ | 370/108 |

Primary Examiner—Benedict V. Safourek
Attorney, Agent, or Firm—Edward W. Callan

[57] ABSTRACT

A gateway data port for coherently transferring multiple-bit input data words in series as part of an input data chain onto an input data line that serially connects the gateway data port and other data ports to a receiver and for coherently transferring multiple-bit output data words from an output data line that serially connects the gateway data port and other data ports to a transmitter. The input data words are provided to the gateway data port asynchronously with the transfer onto the input data line; and the output data words are transmitted over the output data line as part of an output data chain to the gateway data port asynchronously with the transfer from the output data line. The input data words are transferred coherently through an asynchronous receiver and a buffer into an input data shift register, which includes a serial block of adjacent input data register stages defining a plurality of data word bit positions in the input data chain. An "input data present" bit register stage and an "input break" bit register stage are connected in series with the input data register stages and respectively define an input data present bit position and an input break bit position in the input data chain. The input data words are serially shifted onto the input data line from the input data chain shift register. Output data words are serially shifted from the output data line through an output data chain shift register similar to the input register, and transferred coherently then through a buffer and an asynchronous transmitter.

15 Claims, 3 Drawing Figures

COHERENT DATA WORD TRANSFER BY AN ASYNCHRONOUS GATEWAY DATA PORT

BACKGROUND OF THE INVENTION

The present invention generally pertains to data transfer systems and is particularly directed to a gateway data port for transferring data between asynchronous data transfer systems.

More specifically, the present invention provides a gateway data port that can be interfaced between the type of telemetry system described in U.S. patent application No. 428,545 by Herbert Alan Schwan filed September 1982 for "Telemetry System for Distributed Equipment Control and Equipment Monitors" abandoned, in favor of Ser. No. 758,565 filed July 24, 1985 (now U.S. Pat. No. 4,614,944) and peripheral data transfer systems that operate asynchronously therewith. In the system described in the Schwan patent application, data ports are connected in series to a receiver by an input data line for serial transmission of input data to the receiver over the input data line; and data ports are connected in series to a transmitter by an output data line for serial transmission of output data from the transmitter over the output data line. A clock line provides a clock signal to the data ports for common system timing. In such system, the output and/or input data ports are connected by the respective output and/or input data line serially as a chain of shift register stages. A frame of output data from the transmitter is shifted down the output data line with each shift being clocked by a clock pulse, until the beginning of the data frame reaches the last shift register state (data port) in the chain. At that time a frame pulse simultaneously enables all of the shift register stages (data ports) to transfer their instant data from the output data line to their respective data ports. A frame of input data is shifted serially up the input data line to the receiver in the same manner from data ports that are connected to each other in series to function as stages of a shift register. This type of system is referred to herein as a Schwan system.

Improved Schwan systems are described in U.S. patent application No. 561,567 by Anthony E. Diamond filed Dec. 15, 1983 for "Addressable Port Telemetry System" and in U.S. patent application No. 622,984 by Anthony E. Diamond, filed June 21, 1984 for "Addressable-Port, Daisy Chain Telemetry System with Self-Test Capability,", now U.S. Pat. No. 4,617,566. The systems described in the Diamond patent applications include an address circuit at each port for determining when that port is enabled to transfer data signals onto or from the data line independent of the port's physical location on the data line.

U.S. patent application No. 428,545 by Schwan further describes gateway data ports (with reference to FIGS. 15-18 therein) for transferring data between the Schwan system and peripheral data transfer systems that operate asynchronously therewith.

In some peripheral systems the data transfer protocol provides for transmission of character oriented strings of consecutive data words interspersed by breaks, wherein each data word includes a given predetermined number of bits. An example of such a peripheral system is one using the RS-232-C standard for interfacing data communications equipment (DCE) provided by a communications carrier company with data terminal equipment (DTE) provided by data processing hardware manufacturers. According to this standard, each data word has the predetermined given number of bits and the last bit in each word, which is referred to as the stop bit, always is at least plus three volts. A break between data words is indicated by a zero voltage signal that persists for at least the duration of the predetermined given number of bit positions. When peripheral systems utilizing such a data transfer protocol are interfaced with the Schwan system the data words must be coherently transferred to and from the peripheral system and also be coherently transferred over the data lines of the Schwan system, notwithstanding the asynchronous operation of the respective systems.

SUMMARY OF THE INVENTION

The present invention provides a gateway data port for coherently transferring multiple-bit input data words in series as part of an input data chain onto an input data line that serially connects the gateway data port and other data ports to a receiver wherein the input data words are provided to the gateway data port asynchronously with the transfer onto the input data line; and/or for coherently transferring multiple-bit output data words from an output data line that serially connects the gateway data port and other data ports to a transmitter, wherein the output data words are transmitted over the output data line as part of an output data chain to the gateway data port asynchronously with the transfer from the output data line. The gateway data port of the present invention for transferring both input and output data words includes a serial block of adjacent input register stages, an "input data present" bit register stage, an input data word buffer, an input data present bit buffer, an asynchronous receiver, a first logic circuit, a serial block of adjacent output data register stages, an "output data present" bit register stage, an output data word buffer, an asynchronous transmitter, and a second logic circuit.

The serial block of adjacent input data register stages defines a plurality of data word bit positions in the input data chain. The input data present bit register stage is connected in series with the input data register stages and defines an input data present bit position in the input data chain. The input data word buffer has a corresponding plurality of bit buffer cells connected to the input data register stages for buffering the loading of a data word into the data register stages. The input data present bit buffer is connected to the input data present register stage for buffering the loading of an input data present bit into the input data present bit register stage. The asynchronous receiver receives the input data word from an input data source and is connected to the input data word buffer for loading the input data word bits into the input data word bit buffer cells upon command. The first logic circuit is connected to the asynchronous receiver, to the input data word buffer and to the input data present bit buffer for commanding the loading of the data word from the asynchronous receiver into the data word buffer when a complete data word is received from said data word source and the data word bit buffer cells are empty, and for commanding the loading of a data present bit into the data present bit buffer when an input data word is loaded into the input data word buffer. The contents of the input data word buffer and the data present bit buffer are loaded into the data register stages and the data present bit register stages respectively in response to a first transfer signal. The contents of the input register stages are serially shifted onto the input data line.

The serial block of adjacent output data register stages define a plurality of data word bit positions in the output data chain. The output data present bit register stage is connected in series with the output data register stages and defines an output data present bit position in the output data chain. The output data chain from the output data line is serially shifted through the output register stages. The output data word buffer has a corresponding plurality of data word bit buffer cells connected to the output data word register stages for buffering the loading of an output data word from the output data register stages into the asynchronous transmitter. The contents of the output data register stages are latched into the output data word bit buffer cells in response to a second transfer signal. The asynchronous transmitter transmits the output data word to an output data receiver and is connected to the output data word buffer upon command. The second logic circuit is connected to the output data word buffer and to the output data present bit register stage for enabling an output data word to be latched into the output data word buffer cells from the output data register stages in response to the second transfer signal only when an output data present bit is present in the output data present bit register stage, and is further connected to the asynchronous transmitter for commanding the loading of the asynchronous transmitter from the output data word buffer when a "ready to receive" signal is received by the asynchronous transmitter from the output data receiver.

The gateway data port of the present invention allows a Schwan type of data transfer system to be connected to any type of device that normally would be connected through an asynchronous RS-232-C interface system. It should be noted, however, that the system is not limited to the standard RS-232-C asynchronous serial communication protocol, but can also handle other protocols as well.

The embodiments of the gateway data port of the present invention that are adapted to facilitate the RS-232-C standard interface, further include an "input break" bit register, an input break bit buffer, an "output break" bit register and an output break bit buffer.

The input break bit register stage is connected in series with the input data register stages and the input data present bit register stage and defines an input break bit position in the input data chain. The input break bit buffer is connected to the input break bit register stage for buffering the loading of an input break bit into the input break bit register stage. The first logic circuit is further connected to the input break bit buffer for loading a break bit into the input break bit buffer when an input break signal is received by the asynchronous receiver, no coherent input data word is received by the asynchronous receiver, no input break bit is already loaded in the input break bit buffer and no input data word is present in the input data word buffer. The contents of the input break bit buffer are first loaded into the input break bit register stage in response to the first transfer signal when the contents of the input data word buffer are loaded into the input data register stages, and are shifted serially with the contents of the other input register stages onto the input data line.

The output data chain includes an "output break" bit position in series with the output data word bit positions. The "output break" bit register stage is connected in series with the output data register stages and the output data present bit register stage for registering bits serially shifted therethrough from the output data line. The output break bit buffer is connected to the output break bit register stage for latching the contents of the output break bit register stage in response to the second transfer signal. The second logic circuit is further connected to the output break bit buffer and to the output data word buffer for commanding the loading of the asynchronous transmitter from the output break bit buffer when the "ready to receive" signal is received by the asynchronous transmitter from the output data receiver.

Accordingly, the gateway data port of the present invention allows a Schwan type system to be interfaced with DTE's that are character oriented such as character printers and keyboards in a computer system or a teletype system or the like.

Additional features of the present invention are discussed in relation to the description of the preferred embodiment.

DESCRIPTION OF THE PRFERRED EMBODIMENT

Figure 1:
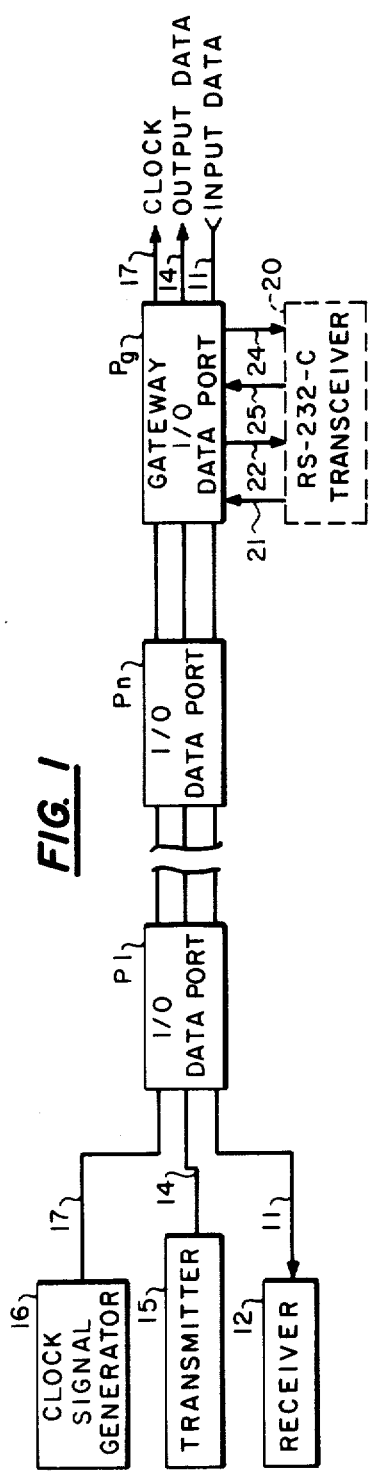
FIG. 1 is a block diagram illustrating the use of the gateway data port of the present invention with a Schwan-type data transfer system.

Referring to FIG. 1, a gateway input/output (I/O) data port Pg is connected in series with other I/O data ports P1, ..., Pn in a Schwan-type data transfer system. In this system an input data line 11 serially connects the data ports P1, ..., Pn, and Pg to a receiver 12 for carrying a chain of input data signals from the data ports P1, ... Pn, Pg to the receiver; and an output data line 14 serially connects the data ports P1, ..., Pn and Pg to a transmitter 15 for carrying a chain of output data signals from the transmitter 15 to the data ports P1, ..., Pn, Pg. A clock signal generator 16 is provided for genrating a pulsed clock signal for common system timing. A clock line 17 carries the clock signal from the clock signal generator 16 to each of the data ports P1, ..., Pn, Pg.

The gateway data port Pg is connected to a transceiver 20 which transmits and receives data in accordance with RS-232-C standard interface protocol. Input data words are serially provided on line 21 from the transceiver 20 to the gateway data port Pg in response to a "clear to send" signal being provided on line 22 from the gateway data port Pt to the transceiver 20. Output data words are serially provided on line 24 from the gateway data port Pg to the transceiver 20 in response to a "ready to receive" signal being provided on line 25 from the transceiver 20 to the gateway data port Pg.

Figure 2:
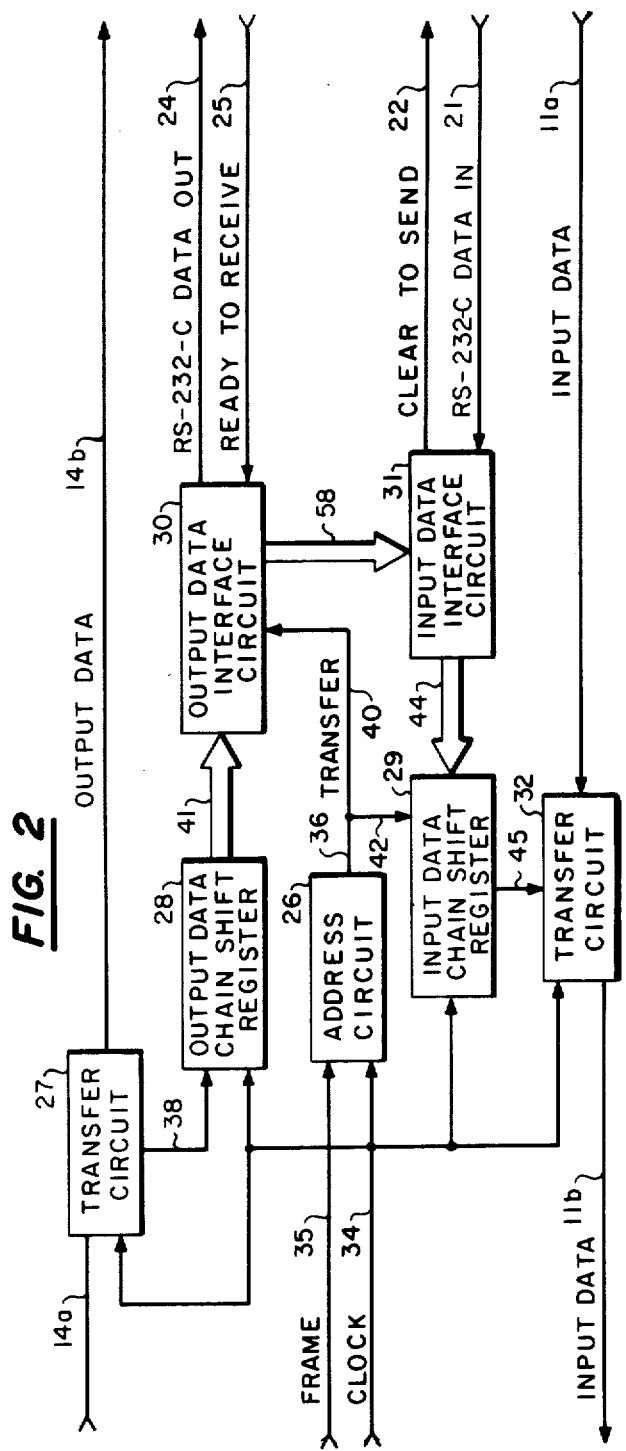
FIG. 2 is a block diagram of the gateway data port of FIG. 1.

Referring to FIG. 2, the gateway data port essentially includes an address circuit 26, an output data transfer circuit 27, an output data chain shift register 28, an input data chain shift register 29, and output data interface circuit 30, an input data interface circuit 31, and an input data transfer circuit 32. A pulsed clock signal on line 34, which is derived from the clock signal on line 17, clocks the operation of the address circuit 26, the output data transfer circuit 27, the output data chain shift register 28, the input data chain shift register 29 and the input data shift register 32.

The address circuit 26 determines when during each frame of data signals the gateway data port Pg is enabled to transfer input data signals received from the transceiver 20 via line 21 onto input data line 11b and to transfer output data signals received on the output data line 14a to the transceiver 20 via line 24 independent of the gateway data port's physical location on the data lines 11, 14. A frame signal pulse is provided on line 35 to the address circuit 26 to indicate the beginning of each frame of data signals. The frame signal is communicated to the gateway data port Pg either in combination with the clock signal pulses on line 17 (as described in the aforementioned U.S. patent application No. 561,567 by Diamond) or in combination with the data signals over the data lines 11, 14 (as described in the second aforementioned U.S. patent application by Diamond filed June 21, 1984). The address circuit 26 counts the clock pulses on line 34 with reference to the receipt of each frame signal pulse on line 35 until a predetermined count stored in the address circuit 26 is reached; and upon reaching the predetermined stored count, the address circuit 26 provides a transfer signal on line 36.

The output data transfer circuit 27 provides the output data signal chain received from the transmitter 15 via line 14a onto line 38. The output data transfer circuit 27 also regenerates the output data chain received on entering output data line 14a and provides the output data chain onto exiting output data line 14b for further transmission to additional data ports that are connected in series with the gateway data port on the remote side thereof with respect to the transmitter 15.

The output data chain on line 38 is serially shifted through the output data chain shift register 28 in response to the clock signal pulses on line 34. When a coherent output data word that is to be transferred to the transceiver 20 is present in the output data chain shift register 28, a transfer signal is provided on line 36 and transferred via line 40 to the output data interface circuit 30 in accordance with the predetermined count stored in the address circuit 26. The contents of the output data chain shift register 28, are latched via lines 41 into the output data interface circuit 30 in response to the transfer signal on line 40.

The output data interface circuit 30 transfers a coherent data word over line 24 to the transceiver 20 only if a ready to receive signal is present on line 25 from the transceiver 20 and if a data word is present.

The input data interface circuit 31 may receive a coherent data word over line 21 from the transceiver 20 only if a clear to send signal is sent on line 22 to the transceiver 20.

When a transfer signal is provided on line 36 by the address circuit 26 in accordance with the predetermined count stored therein, it is transferred to the input data shift register 29 via line 42. The input data word received by the input data interface circuit 31 is loaded via lines 44 into the input data chain shift register in response to the transfer signal on line 42; and immediately thereupon serially shifted from the input data chain shift register 29 onto the exiting input data line 11b via the line 45 and the input data transfer circuit 32.

The input data transfer circuit 32 merges the input data signal chain from the gateway data port on line 45 into the input data chain received over entering input data line 11a from other data ports that are connected in series with the gateway data port on the remote side thereof with respect to the receiver 12. The input data transfer circuit also regenerates the input data chain received on entering input data line 11a and provides the merged input data chain on the exiting input data line for transmission to the receiver 12.

Although only one address circuit 26 is shown in the embodiment of FIG. 2, separate address circuits may be provided to independently time the provision of separately generated transfer signals on lines 40 and 42 to the output data interface circuit 30 and the input data shift register 29 respectively.

Further details of alternative embodiments of the address circuit 26, the output data transfer circuit 27 and the input data transfer circuit 32 are contained in the two aforementioned U.S. patent applications by Diamond, the disclosures of which applications are incorporated herein by reference.

Figure 3:
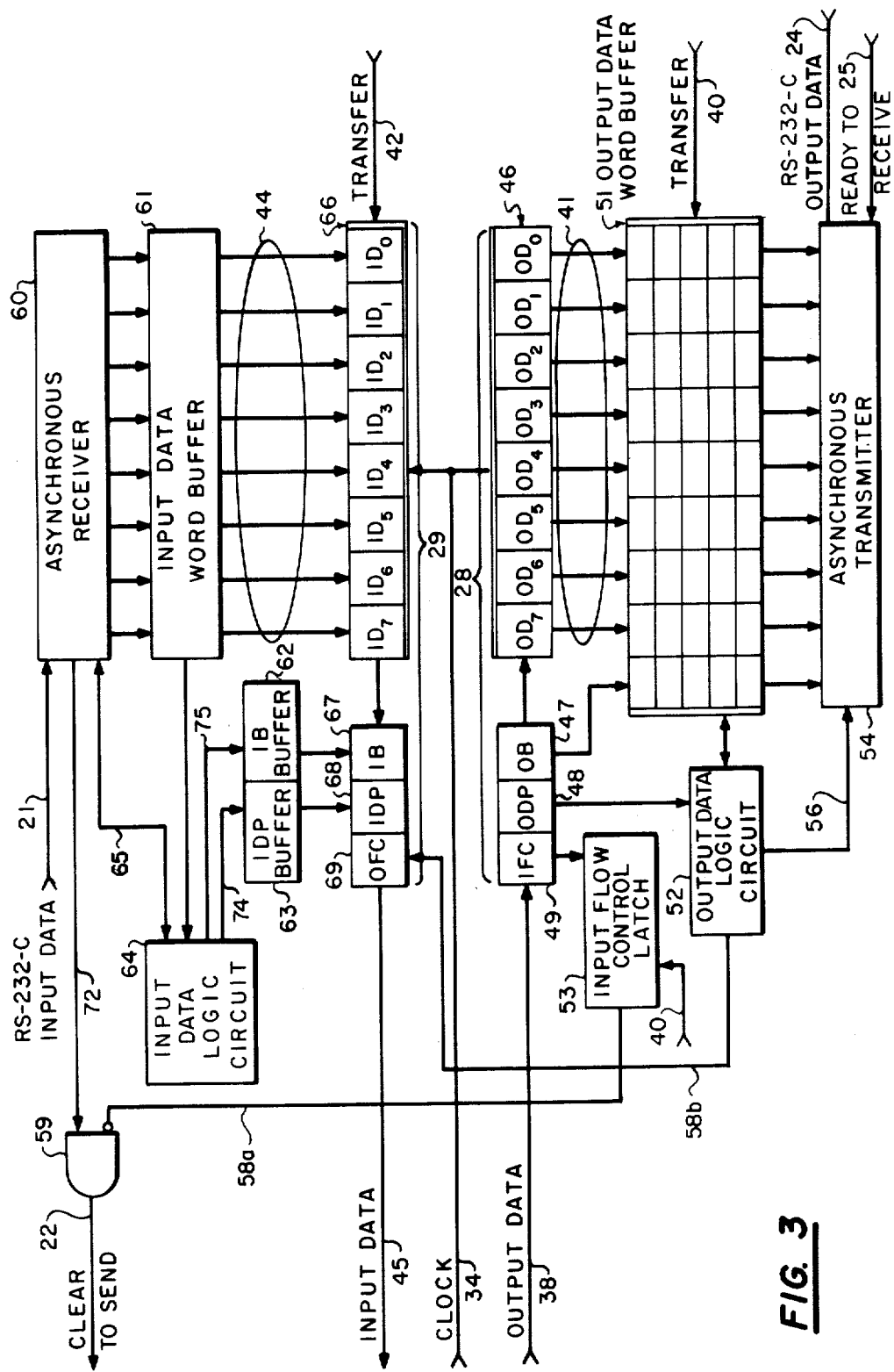
FIG. 3 is a block diagram of the preferred embodiment of the combination of the interface circuits and shift registers of the gateway data port of FIG. 2 which is adapted to interface with DTE equipment in accordance with the R-232-C standard.

Further details of the combination of the output data chain shift register 28, the output data interface circuit 30, the input data chain shift register 29 and the input data interface circuit 31 are described herein with reference to FIG. 3. Referring to FIG. 3, the output data shift register 28 includes a serial block of eight adjacent output data register stages 46 defining eight output data word bit positions $OD_0$–$OD_7$ in the output data chain, an output break bit register stage 47 defining an output break bit position OB in the output data chain, an output data present bit register stage 48 defining an output data present bit position ODP in the output data chain and an input flow control bit register stage 49 defining an input flow control bit position IFC in the output data chain. The output data chain on line 38 is serially shifted through the register stages 46, 47, 48, 49 of the output data shift register.

The output data interface circuit 30 includes an output data word buffer 51, an output data logic circuit 52, an input flow control latch 53 and an asynchronous transmitter 54.

The output data word buffer 51 is a multi-level first-in first-out (FIFO) queue. In the preferred embodiment, the buffer 51 has five levels. At least three levels are required. Each level of the buffer 51 has nine buffer cells corresponding respectively to the eight output data word register stages 46 and the output break bit register stage 47. The eight output data word buffer cells in the top level of the buffer 51 are connected in parallel to the respective output data word register stages 46 and the break bit buffer cell is connected in parallel to the output break bit buffer stage 47.

The contents of the output data register stages 46 are latched into the output data word bit buffer cells 51 in response to the transfer signal on line 40.

The output data word buffer 51 buffers the loading of the output data words into the asynchronous transmitter 54.

The asynchronous transmitter 54 loads a coherent data word from the output data word buffer 51 in response to a command signal on line 56 from the output data logic circuit 52. The asynchronous transmitter 54 then transmits the coherent data word bits serially over line 24 to the transceiver 20.

The output data logic circuit 52 is connected to the output data word buffer 51 and to the output data present bit register stage 48 for enabling an output data word to be latched into the output data word buffer cells 51 from the output data register stages 46 in response to the transfer signal on line 40 only when a data present bit is present in the data present bit register stage 48. The logic circuit 52 is further connected to the asynchronous transmitter 54 for commanding the loading of the asynchronous transmitter 54 from the data word buffer 51 when a "ready to receive" signal is received on line 25 by the asynchronous transmitter from the transceiver 20.

When the output data chain from line 38 provides a break bit in the output break bit register 47 at the time when a transfer signal is provided on line 40, the output data chain also provides zeros in all of the output data register stages 46 and an output data present bit in the output data present bit register stage 48. Accordingly, when such a condition occurs, the output data word buffer 51 latches the output break bit into the top level of the output data word buffer 51 in response to the transfer signal on line 40 and the top level of output data word bit buffer cells in the output data word buffer 51 are all loaded with zeros.

When the break bit eventually is loaded from the output data word buffer 51 into the asynchronous transmitter 54, it is recognized as such by the asynchronous transmitter 54; whereupon the asynchronous transmitter 54 serially transmits a break signal according to the RS-232-C standard over line 24 to the transceiver 20.

When it is desired to interrupt the flow of input data through the gateway data port Pg to the receiver 12 an input flow control bit is included in the input flow control bit position of the output data chain provided to the output data chain shift register 28 from line 38 when the transfer signal is provided on line 40. This input flow control bit is latched into the flow control latch 53 in response to the transfer signal on line 40. The input flow control latch is connected by line 58$a$ to an inverting input of an AND gate 59 in the input data interface circuit 31.

The input data interface circuit further includes an asynchronous receiver 60, an input data word buffer 61, an input break bit buffer 62, an input data present bit buffer 63 and an input data logic circuit 64.

The input data chain shift register 29 includes a serial block of eight adjacent input data register stages 66 defining eight input data word positions $ID_0$–$ID_7$ in the input data chain, an input break bit register stage 67 defining an input break bit position IB in the input data chain, an input data present bit register stage 68 defining an input data present bit position IDP in the input data chain, and an output flow control bit register stage 69 defining an output flow control bit position in the input data chain. The input data chain is serially shifted from the input data chain shift register onto line 45.

The input data word buffer 61 includes eight bit buffer cells corresponding to the eight input data word register stages 66 and respectively connected in parallel thereto. The input data word buffer 61 buffers the loading of data into the input data register stages 66.

The input break bit buffer 62 is connected in parallel to the input break bit register stage 67 for buffering the loading of an input break bit into the input break bit register stage 67.

The input data present bit buffer 63 is connected in parallel to the input data present bit register stage 68 for buffering the loading of an input data present bit into the input data present bit register stage 68.

The asynchronous receiver 60 serially receives the bits of coherent input data words on line 21 from the transceiver 20. The asynchronous receiver 60 loads the bits of a received coherent data word in parallel into the respective cells of the input data word buffer 61 in response to a command signal on line 65 from the input data logic circuit.

When an input data word is loaded by the asynchronous receiver 60 into the input data word buffer 61, the asynchronous receiver provides a "clear to send" signal on line 72 which is connected to a non-inverting input of the AND gate 59. The clear to send signal is gated by the AND gate 59 onto line 22 and thence to the transceiver 20 only when an input flow control bit is not present in the input flow control latch 53.

The input data logic circuit 64 is connected to the asynchronous receiver 60, to the input data word buffer 61 and to the input data present bit buffer 63 for commanding the loading of an input data word from the asynchronous receiver 60 into the input data word buffer 61 when a complete data word is received from the transceiver 20 and the data word bit buffer cells 61 are empty, and for providing a command signal on line 74 to command the loading of an input data present bit into the input data present bit buffer 63 when the input data word is loaded into the input data word buffer 61.

The RS-232-C standard signals received by the asynchronous receiver 60 on line 21 from the transceiver 20 include break signals in series with the input data words.

The input data logic circuit 64 is further connected to the input break bit buffer 62 for loading an input break bit into the input break bit buffer 62 via line 75 when a break signal is received by the asynchronous receiver 60 on line 21, no coherent input data word is received by the asynchronous receiver 60 on line 21, no input break bit is already loaded in the input break bit buffer 61 and no input data word is present in the input data word buffer 61.

The contents of the input data word buffer 61, the input break bit buffer 62 and the input data present bit buffer 63 are loaded into the input data register stages 66, the input break bit register stage 67, and the input data present bit register stage 68 respectively in response to the transfer signal on line 42.

The output flow control bit register state 69 is loaded with an output flow control bit via line 58$b$ from the output data logic circuit 52 when there are at least two output data words present in the FIFO queue of the output data word buffer 51 upon receipt of the transfer signal on line 40 and prior to the latching of the present contents of the output data register stages 46 into the top level of the output data word buffer 51. The input flow control bit is thereby transmitted on the input data line 11 to the receiver 12; and a computer (not shown) connected to the receiver 12 ceases the transmission over the output data line 14 from the transmitter 15 of output data words intended for the gateway data port Pg.

In alternative embodiments the number of input data register stages may be a different number, such as sixteen, and the data chain shift registers can be expanded to include additional information bits, such as error bits. Circuitry can be provided to insert an error bit in an extra bit position in the input data chain whenever any error condition is detected in the gateway data port.

The respective rates at which data word bits are serially shifted by the asynchronous transmitter 54 and the asynchronous receiver 60 are independent of the frequency of the pulsed clock signal on line 34 and of the frame rate of the transfer signals on lines 40 and 42. Nevertheless, the gateway data port Pg coherently transfers output data words from the transmitter 15 to the RS-232-C standard transceiver 20 and coherently transfers input data words from the RS-232-C standard transceiver 20 to the receiver 12.

We claim:

1. A gateway data port for coherently transferring multiple-bit input data words in series as part of an input data chain onto an input data line that serially connects the gateway data port and other data ports to a receiver, wherein the data words are provided to the gateway data port asynchronously with said transfer, said gateway data port comprising
   - a serial block of adjacent input data register stages defining a plurality of data word bit positions in said input data chain;
   - a "data present" bit register stage in series with the data word register stages and defining a data present bit position in said input data chain;
   - an input data word buffer having a corresponding plurality of bit buffer cells connected to the input data word register stages for buffering the loading of said data word into the data register stages;
   - a data present bit buffer connected to the data present register stage for buffering the loading of a said data present bit into the data present bit register stage;
   - an asynchronous receiver for receiving said data word from an input data source and connected to the input data word buffer for loading said input data word bits into the data word bit buffer cells upon command;
   - a logic circuit connected to the asynchronous receiver, to the input data word buffer and to the data present bit buffer for commanding the loading of said data word from the asynchronous receiver into the data word buffer when a complete data word is received from said data word source and the data word bit buffer cells are empty, and for commanding the loading of a data present bit into the data present bit buffer when a said input data word is loaded into the input data word buffer;
   - means for loading the contents of the input data word buffer and the data present bit buffer into the data register stages and the data present bit register stages respectively in response to a transfer signal; and
   - means for serially shifting the contents of the register stages onto said input data line.

2. A gateway data port according to claim 1,
   wherein the asynchronous receiver receives "break" bits in series with said data words from said input data source;
   wherein said gateway data port further comprises
   a "break" bit register stage in series with the data word register stages and the data present bit register stage and defining a break bit position in said input data chain; and
   a break bit buffer connected to the break bit register stage for buffering the loading of said break bit into the break bit register stage; and
   wherein the logic circuit is further connected to the break bit buffer for loading a break bit into the break bit buffer when a break signal is received by the asynchronous receiver, no coherent input data word is received by the asynchronous receiver, no break bit is already loaded in the break bit buffer and no input data word is present in the input data word buffer; and
   wherein the contents of the break bit buffer are loaded into the break bit register stage in response to said transfer signal when the contents of the data word buffer are loaded into the data register stages, and are shifted serially with the contents of the other register stages onto said input data line.

3. A gateway data port according to claim 1, wherein the asynchronous receiver provides a "clear to send" signal to the input data source when a said input data word is loaded into the input data word buffer.

4. A gateway data port for coherently transferring multiple-bit output data words from an output data line that serially connects the gateway data port and other data ports to a transmitter, wherein the data words are transmitted over the output data line as part of an output data chain to the gateway data port asynchronously with said transfer, said gateway data port comprising
   a serial block of adjacent output data register stages defining a plurality of data word bit positions in said output data chain;
   a "data present" bit register stage in series with the data word register stages and defining a data present bit position in said output data chain;
   wherein the output data chain from the output data line is serially shifted through the output data register stage and the data present bit register stage;
   an output data word buffer having a corresponding plurality of data word bit buffer cells connected to the output data word register stages for buffering the loading of a said data word into an asynchronous transmitter;
   wherein the contents of the output data register stages are latched into the output data word bit buffer cells in response to a transfer signal;
   a said asynchronous transmitter for transmitting said data word bits to an output data receiver and connected to the output data word buffer for loading a said output data word from the data word bit buffer upon command; and
   a logic circuit connected to the output data word buffer and to the data present bit register stage for enabling a said output data word to be latched into the output data word buffer cells from the output data register stages in response to said transfer signal only when a data present bit is present in the data present bit register stage, and further connected to the asynchronous transmitter for commanding the loading of the asynchronous transmitter from the data word buffer when a "ready to receive" signal is received by the asynchronous transmitter from said output data receiver.

5. A gateway data port according to claim 4,
   wherein the output data chain includes a "break" bit position in series with said data word bit positions; and
   wherein said gateway data port further comprises
   a "break" bit register stage in series with the data word register stages and the data present bit register stage for registering bits serially shifted therethrough from the output data line; and
   a break bit buffer cell connected to the break bit register stage for latching the contents of the break bit register stage in response to said transfer signal; and wherein the logic circuit is further connected to the break bit buffer and to the output data word buffer for commanding the loading of the asynchronous transmitter from the break bit buffer when said "ready to receive" signal is received by the asynchronous transmitter from said output data receiver.

6. A gateway data port according to claim 5, wherein the output data word buffer is a multi-level first-in-first-out (FIFO) queue.

7. A gateway data port according to claim 4, wherein the output data word buffer is a multi-level first-in-first-out (FIFO) queue.

8. A gateway data port for coherently transferring multiple-bit input data words in series as part of an input data chain onto an input data line that serially connects the gateway data port and other data ports to a receiver wherein the input data words are provided to the gateway data port asynchronously with said transfer onto the input data line; and for coherently transferring multiple-bit output data words from an output data line that serially connects the gateway data port and other data ports to a transmitter, wherein the output data words are transmitted over the output data line as part of an output data chain to the gateway data port asynchronously with said transfer from the output data line, said gateway data port comprising a serial block of adjacent input data register stages defining a plurality of data word bit positions in said input data chain;

an "input data present" bit register stage in series with the input data register stages and defining an input data present bit position in said input data chain;

an input data word buffer having a corresponding plurality of bit buffer cells connected to the input data register stages for buffering the loading of a said data word into the data register stages;

an input data present bit buffer connected to the input data present register stage for buffering the loading of a said input data present bit into the input data present bit register stage;

an asynchronous receiver for receiving said input data word from an input data source and connected to the input data word buffer for loading said input data word bits into the input data word bit buffer cells upon command;

a first logic circuit connected to the asynchronous receiver, to the input data word buffer and to the input data present bit buffer for commanding the loading of said data word from the asynchronous receiver into the data word buffer when a complete data word is received from said data word source and the data word bit buffer cells are empty, and for commanding the loading of a data present bit into the data present bit buffer when a said input data word is loaded into the input data word buffer;

means for loading the contents of the input data word buffer and the data present bit buffer into the data register stages and the data present bit register stages respectively in response to a first transfer signal;

means for serially shifting the contents of the input register stages onto said input data line;

a serial block of adjacent output data register stages defining a plurality of data word bit positions in said output data chain;

an "output data present" bit register stage in series with the output data register stages and defining an output data present bit position in said output data chain;

wherein the output data chain from the output data line is serially shifted through the output register stages;

an output data word buffer having a corresponding plurality of data word bit buffer cells connected to the output data word register stages for buffering the loading of a said output data word from the output data register stages into an asynchronous transmitter;

wherein the contents of the output data register stages are latched into the output data word bit buffer cells in response to a second transfer signal;

a said asynchronous transmitter for transmitting said output data word to an output data receiver and connected to the output data word buffer for loading a said output data word from the data word bit buffer upon command; and a second logic circuit connected to the output data word buffer and to the output data present bit register stage for enabling a said output data word to be latched into the output data word buffer cells from the output data register stages in response to said second transfer signal only when an output data present bit is present in the output data present bit register stage, and further connected to the asynchronous transmitter for commanding the loading of the asynchronous transmitter from the output data word buffer when a "ready to receive" signal is received by the asynchronous transmitter from said output data receiver.

9. A gateway data port according to claim 8, wherein the asynchronous receiver provides a "clear to send" signal to the input data source when a said input data word is loaded into the input data word buffer.

10. A gateway data port according to claim 9, further comprising an "input flow control" register stage in series with the output data register stages and defining an input flow control bit position in said output data chain;

an input flow control bit latch connected in parallel to the output flow control register for latching the contents of the input flow control register stage in response to said second transfer signal; and means coupled to the input flow control bit latch and the asynchronous receiver for inhibiting said clear to send signal from being provided to the input data source when a said input flow control bit is present in the input flow control bit latch.

11. A gateway data port according to claim 8, wherein the output data chain includes an "output break" bit position in series with said output data word bit positions; and wherein said gateway data port further comprises an "output break" bit register stage in series with the output data register stages and the output data present bit register stage for registering bits serially shifted therethrough from the output date line; and an output break bit buffer connected to the output break bit register stage for latching the contents of the output break bit register stage in response to said second transfer signal;

wherein the second logic circuit is further connected to the output break bit buffer and to the output data word buffer for commanding the loading of the asynchronous transmitter from the output break bit buffer when said "ready to receive" signal is received by the asynchronous transmitter from said output data receiver.

12. A gateway data port according to claim 11, wherein the output data word buffer is a multi-level first-in-first-out (FIFO). queue.

13. A gateway data port according to claim 12, further comprising an output flow control bit register stage in series with the input data register stages and the input data present bit register stage and defining an output flow control bit position in said input data chain;

wherein the FIFO queue has at least three levels; and wherein the second logic circuit is further connected to the output flow control bit register stage for entering a bit into the output flow control bit register stage when there are at least two output data words present in the FIFO queue upon receipt of said second transfer signal prior to said latching of the present contents of the output data register stages into the FIFO queue.

14. A gateway data port according to claim 8, wherein the output data word buffer is a multi-level first-in-first-out (FIFO) queue.

15. A gateway data port according to claim 8, wherein the asynchronous receiver receives "input break" bits in series with said input data words from said input data source;

wherein said gateway data port further comprises an "input break" bit register stage in series with the input data register stages and the input data present bit register stage and defining an input break bit position in said input data chain; and an input break bit buffer connected to the input break bit register stage for buffering the loading of a said input break bit into the input break bit register stage; and wherein the first logic circuit is further connected to the input break bit buffer for loading a break bit into the input break bit buffer when an input break signal is received by the asynchronous receiver, no coherent input data word is received by the asynchronous receiver, no input break bit is already loaded in the input break bit buffer and no input data word is present in the input data word buffer; and wherein the contents of the input break bit buffer are first loaded into the input break bit register stage in response to said first transfer signal when the contents of the input data word buffer are loaded into the input data register stages, and are shifted serially with the contents of the other input register stages onto said input data line.

* * * * *